United States Patent Office 3,055,712
Patented Sept. 25, 1962

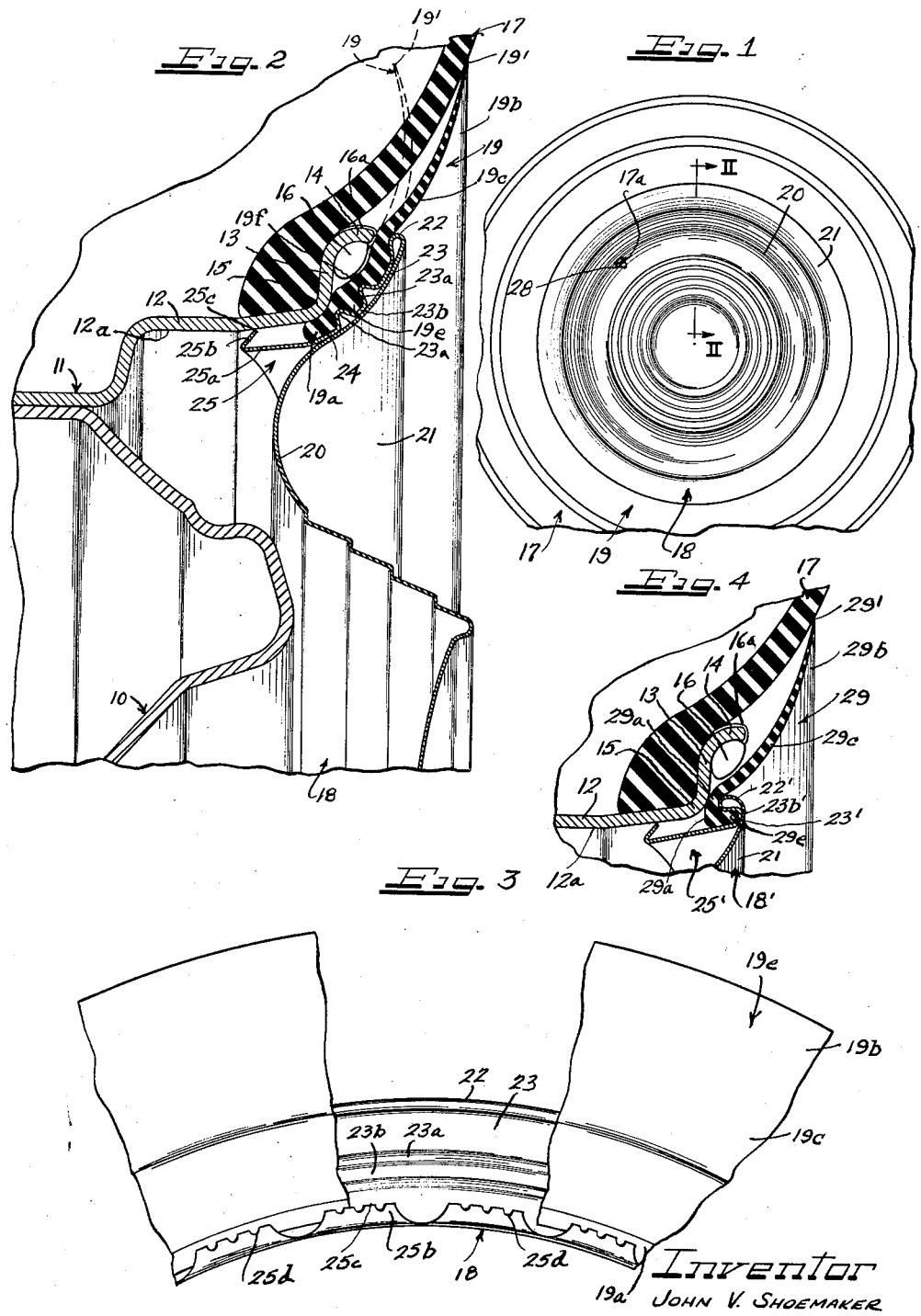

3,055,712
WHEEL COVER
John V. Shoemaker, Detroit, Mich., assignor to Lyon Incorporated, Detroit, Mich., a corporation of Delaware
Filed Jan. 27, 1958, Ser. No. 711,303
4 Claims. (Cl. 301—37)

The present invention relates to improvements in wheel structures and more particularly concerns the provision of novel means for providing a wheel with a simulated white or colored side wall for a tire on the wheel.

For ornamental purposes, automobile tires are commonly provided with white side walls, the remainder of the tire being of a more or less black appearance. The white rubber used for the white side wall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white or colored side walls, generally resulting in a sacrifice of quality such as in the quality of the white side wall. To overcome the disadvantages of cure compromise, it has been proposed to secure the white side wall portion or veneer to the side wall of the tire after the tire has been vulcanized. Such after-attached side wall members are inherently liable to such disadvantages as peeling, and the like, and of course require a separate attaching or vulcanizing operation that raises cost.

It has also been heretofore proposed to provide separate simulated white side wall ring members that are secured between the terminal flange of the tire rim and the bead portion of the tire and which hug the side wall of the tire. Such simulated or mock tire white side wall rings require, of course, that the tire be deflated in order to install the ring members. Should such simulated white side wall rings become damaged, it is necessary to deflate the tire not only to remove the damaged ring but also to replace the ring. Furthermore, a disadvantage of such simulated white side wall rings is that, especially with tubeless tires, there is interference with proper sealing, gripping engagement of the tire bead portion with the opposing surfaces of the tire rim and more particularly the radial flange or the radial rim portion of the terminal flange since formerly the white side wall ring was interposed between the tire side wall and the radial flange or radial portion of the terminal rim flange.

It is accordingly an important object of the present invention to overcome the foregoing difficulties and disadvantages of the prior expedients and to provide a simulated tire white side wall of improved appearance and which can be applied, or removed, or replaced without disturbing the tire.

An important object of the present invention is to provide an improved tire side wall simulating member and wheel and cover assembly which has a considerably greater resistance to the pull-out of the tire side wall simulating member when it is in assembly upon a vehicle wheel.

Another and more specific object of the present invention is to provide tongue and groove means between a tire side wall simulating member and a wheel cover to resist pull-out of the tire side wall simulating member from the wheel when in assembly therewith.

Another important object of the present invention is to provide an improved tire side wall simulating member which when assembled with the wheel is maintained out of engagement with the terminal rim flange to lengthen the useful life thereof due to the absence of frictional wear against the tire side wall simulating member by the terminal rim flange.

A further object of the present invention is to provide a novel tire side wall simulating member which is adapted for optional assembly with a wheel cover for disposition over the outer side of the wheel.

Still another object of the present invention is to provide rib means on the cover which are adapted to become embedded in the inner margin of the tire side wall simulating member so the tire side wall simulating ring member will have greater resistance to radial pull-out.

Another and still further object of the present invention is to provide a tire side wall simulating flexible ring device which is adapted to be carried in clamped engagement with the outer side of a tire rim.

Yet another object of the present invention is to provide cushioning means for a wheel cover, which cushioning means is in the form of a simulating tire side wall ring member.

Other objects, features and advantages of the present invention will more readily become apparent in view of the following detailed description of certain preferred embodiments thereof, taken in conjunction with the accompanying sheet of drawings, in which:

FIGURE 1 is an outer side elevation of a wheel structure embodying features of the present invention;

FIGURE 2 is an enlarged fragmentary cross-sectional view in full and dotted lines taken substantially on the line II—II of FIGURE 1 looking in the direction indicated by the arrows;

FIGURE 3 is an enlarged fragmentary rear elevation of the tire side wall simulating ring member and cover assembly; and FIGURE 4 is an enlarged fragmentary cross-sectional view similar to FIGURE 2 only illustrating a modified form of my invention.

Referring to FIGURES 1 and 2, an automobile wheel including a disk spider wheel body 10 supports a tire rim 11 including an intermediate generally axially extending rim flange 12, a radial rim flange 13, and an axial terminal rim flange 14. The rim flanges 12 and 13 are junctioned at 15 and provide an annular support for purposes which will hereafter become apparent. Supported upon the terminal rim flange in the groove at the outer side of the wheel defined by the radial and terminal rim flanges 13 and 14 are a series of wheel balancing weight structures 16 which have hooked ends 16a hooked over the terminal rim flange 14 in a conventional manner to sustain them in assembly. Mounted upon the tire rim is a pneumatic tire assembly 17 of preferably the tubeless type and which may be inflated by inserting air into a valve stem 17a shown in FIGURE 1.

Disposed at the outer side of a wheel is a circular preferably metal wheel cover structure 18 which may be comprised of any suitable material such as stainless steel. Also disposed at the outer side of the wheel between the cover member and the tire rim 18 is a side wall ring member indicated generally at 19.

The wheel cover 18 is preferably of the self-retaining type and to this end, the cover 18 includes an intermediate dished portion 20 radially outwardly of which is a generally radially outwardly axially outwardly projecting annular marginal portion 21 of a diameter to overlie the terminal rim flange 14 as well as the hooked ends 16a of the clips.

The outer marginal portion 21 is underturned and provided with an annular bead 22 which bead leads into and underturned generally radially and axially inwardly extending flange 23 which is abutted at least along a portion of its length against the underneath surface on the axially inner side of the cover margin 21. This flange 23 is undulated and provided with a series of circumferentially extending annular ribs and grooves indicated at 23a and 23b respectively. Radially and axially inwardly of the radially innermost rib 23a, the underturned flange 23 is bottomed against the cover at 24 to provide a back up for cover retaining structure 25 here illustrated in the form of a series of circumferentially spaced returned bent type fingers each of which includes an axial portion 25a and a return bent oblique generally radially and axially outwardly extending short stiff flange 25b which has an edge 25c engaged in edgewise engagement with an inside surface 12a of the intermediate rim flange 12. In order to increase the effectiveness of the gripping edges 25c, each of the edges is notched at 25d thereby dividing up and providing each of the short stiff oblique finger portions 25b with a series of edges or edge areas 25c.

The terminal edges 25c are retainingly engageable in gripping cover retaining relation with the intermediate flange surface 12a since they are inwardly deflected from a normal diameter slightly larger than the diameter of the inside surface 12a of the tire rim.

For affording the appearance of the tire 17 having a white side wall, the ring member 19 is preferably made from a rubber-like material and for which a synthetic rubber such as butyl is especially desirable. Such synthetic rubber is characterized by especially desirable form-sustaining resilient flexibility, good color qualities and excellent durometer control.

For affording a tire side wall simulating shape to the ring member 19, it is of generally axially outwardly curved transverse or radial shape terminating in a thin, and in this instance a substantially feather edged radially outer extremity 19' engageable against the side wall of the tire 17. In assembly with the wheel, the outer extremity 19' appears as a fine line generally merging with the wheel on the incurve of the outer tire side wall so that the ring member appears on the wheel as though it were an integral side wall portion of the tire.

The side wall ring member 19 is provided with a radially inner stepped margin 19a and a radially outer margin 19b which margins 19a and 19b are linked together by an annular arcuate intermediate ring section 19c. The inner margin 19a is thickened a distance extending from radially inwardly of the rim junction 15 radially outwardly generally to the area of the terminal rim flange 14 and the cover bead 22. The axially outer surface of the inner margin 19a is also undulated providing ribs and grooves 19e and 19f respectively. These ribs and grooves 19e and 19f are adapted to nestingly engage with the ribs and grooves 23a and 23b on the wheel cover 18 and when so engaged operate to resist pullout of the side wall ring member 19 from between the cover 18 and the wheel.

As is apparent from FIGURE 2, the tire side wall ring member 19 is bridged over or extended across the terminal rim flange 14 and the ring member 19 is of a progressively decreasing cross-sectional thickness from the terminal rim flange 14 outwardly to the outer feather edge 19'.

To assemble the tire side wall and the cover member on the wheel they may be first assembled together by engaging the inner margin 19a with one side of the cover along the undulated flange surface 23, and by stretching the ring member at an opposite side thereof so that the inner margin 19a may be moved free of the terminals 25b and nestingly lodged with the cover 18.

The cover 18 and tire side wall ring member 19 when assembled together may be assembled with the wheel by aligning the valve stem 17a with cover opening 28 and thereafter urging the assembly axially inwardly causing the terminal edges 25c to be resiliently deflected into biting cover retaining engagement with the tire rim. As the assembly is assembled on the wheel the feather edge 19' is deflected along the incurve of the tire axially outwardly from the dotted line position shown in FIGURE 2 to the full line position shown in FIG. 2, thereby placing the feather edge 19' in snug engagement against the tire 17. In other words, since the inner margin is held in place by the interlocked ribs and grooves, the ring may flex at the area where engaged against the outer cover margin edge 21. When the cover and ring assembly is in full engagement with the wheel the axially inner surface of the inner margin 19a is abuttingly engaged against the tire rim generally at the rim junction 15 and at the terminal flange 14 and radial movement of the ring is substantially prohibited and therefore, the feather edge 19' is substantially prevented from wearing the tire side wall since liitle if any radial movement of the edge may occur.

To remove the cover assembly from the wheel the feather edge 19' may be peeled back and away from the tire 17 and fulcrummed upon the cover bead 22 so that a pry-off tool may be inserted underneath the cover to remove the cover from the wheel.

In FIGURE 4 is shown a modified form of my invention wherein a cover is designated generally at 18' which cover includes an outer margin 21' and an outer annular bead 22' which bead is turned over in an axially inwardly direction defining on the radially inner side an annular groove 23b'. The annular turned bead 22' is connected on the axially inner side of the cover to a radially and axially inwardly extending flange portion 23' which is abutted against the inner surface of the cover margin 21' and which is connected at its radially inner end to retaining fingers 25' which are of the same order as that shown in FIGURE 2.

Also shown in FIGURE 4 is a modified ring member 29 which ring member is of much the same construction as the ring member 19 shown in FIGURE 2 except that inner margin 29a is of a slightly different construction than inner margin 19a shown in FIGURE 2.

The ring member 29 includes the inner margin 29a, an outer margin 29b, and an intermediate linking or bridging section 29c connecting the margins together and which is bridged over the terminal rim flange 14 and is engaged at its outer feather edge 29' against the incurve area of the tire 17.

The inner margin 19a includes an annular rib or tongue 29e which is lodged within the groove 23b'. The inner margin 19a is abutted against the junction of the rim flanges at 15 and since the tongue or rib 29e is engaged within the groove 23b', radial pull-out of the side wall ring member is substantially resisted.

The cover 18' and the ring member 29 may be assembled in much the same manner as that described before in connection with the modification shown in FIGURES 1–3 and to this end when the inner margin 29a is elastically stretched and moved over the fingers 25', the tongue or annular rib 29e is engaged within the annular groove 23b'. Thus, the turned beaded margin and the tongue or annular rib 29e cooperate together when the cover is in assembly and the inner margin 29a is bottomed against the tire rim 11 to resist radial pullout of the ring member from the wheel and in addition the cover is maintained in cushioned cover retaining engagement with the wheel.

In both forms of my invention it will be noted that the rings are provided with an annular curved surface disposed axially opposite the weights 16 whereby the surface is sufficiently spaced from the rim to permit weights 16 to be installed on the radially inner side of the terminal rim flange 14 at any circumferential position desired.

It will be understood that modifications and variations may be effected without departing from the scope of the novel concepts of the present invention.

I claim as my invention:

1. In a wheel structure, a wheel including a multi-flanged stepped tire rim and a pneumatic tire with the rim having connected intermediate, radial and terminal rim flanges, a wheel cover section for overlying the wheel having an outer cover margin axially spaced in close proximity to the rim and which cover margin has on its underside a cover rib providing a radially inwardly facing cover shoulder, a non-metallic tire side wall ring including inner and outer ring margins with the outer ring margin being disposed opposite the tire side wall and with said inner ring margin having a ring rib provided with a radially outwardly facing ring shoulder disposed radially inwardly of the terminal rim flange, the cover and ring shoulders being in lapped engagement with the cover shoulder being disposed radially outwardly of the ring shoulder, and resiliently deflectable press-on, pry-off cover retaining extensions on the cover section disposed generally axially inwardly of the inner ring margin in press-on, pry-off retained engagement with the wheel, the extensions exerting ring retaining force through the outer cover margin axially inwardly against the inner ring margin and maintaining the axially inner surface of the inner ring margin in clamped engagement against the rim thereby sustaining the wheel cover section and the tire side wall ring on the wheel in assembly together and insuring continued interlocked engagement between the cover and ring shoulders, the outer cover margin being provided with an integral underturned cover flange and which flange bears said cover rib and shoulder, the cover retaining extensions being formed integral with said flange and disposed for cover retaining engagement with the intermediate rim flange, said underturned cover flange and said inner ring margin each having more than one of said ribs and shoulders interlocked together and with said inner ring margin bottomed against said rim at a juncture between the intermediate and radial rim flanges.

2. In a wheel structure, a wheel including a multi-flanged stepped tire rim and a pneumatic tire with the rim having connected intermediate, radial and terminal rim flanges, a wheel cover section for overlying the wheel having an outer cover margin axially spaced in close proximity to the rim and which cover margin has on its underside a cover rib providing a radially inwardly facing cover shoulder, a non-metallic tire side wall ring including inner and outer ring margins with the outer ring margin being disposed opposite the tire side wall and with said inner ring margin having a ring rib provided with a radially outwardly facing ring shoulder disposed radially inwardly of the terminal rim flange, the cover and ring shoulders being in lapped engagement with the cover shoulder being disposed radially outwardly of the ring shoulder, and resiliently deflectable press-on, pry-off cover retaining extensions on the cover section disposed generally axially inwardly of the inner ring margin in press-on, pry-off retained engagement with the wheel, the extensions exerting ring retaining force through the outer cover margin axially inwardly against the inner ring margin and maintaining the axially inner surface of the inner ring margin in clamped engagement against the rim thereby sustaining the wheel cover section and the tire side wall ring on the wheel in assembly together and insuring continued interlocked engagement between the cover and ring shoulders, the outer cover margin being provided with an integral underturned cover flange and which flange bears said cover rib and shoulder, the cover retaining extensions being formed integral with said flange and disposed for cover retaining engagement with the intermediate rim flange, said inner ring margin being turned axially outwardly at its radially inner end forming said ring rib and by said outer cover margin being turned axially inwardly and forming said cover rib.

3. In a wheel structure, a wheel including a multi-flanged stepped tire rim and a pneumatic tire with the rim having connected intermediate, radial and terminal rim flanges, the intermediate and radial rim flanges having a juncture rim shoulder at their juncture, wheel balancing weights mounted on the rim underlying the terminal rim flange, a wheel cover section for overlying the wheel having an outer cover margin axially spaced in close proximity to the rim and which cover margin has on its underside a cover rib providing a radially inwardly facing cover shoulder, a non-metallic tire side wall ring having an annular curved ring surface disposed on an axially outer side of the weights, the ring including inner and outer ring margins with the outer ring margin being disposed opposite the tire side wall and with said inner ring margin having a ring rib provided with a radially outwardly facing ring shoulder disposed radially inwardly of the terminal rim flange, the cover and ring shoulders being in lapped engagement with the cover shoulder being disposed radially outwardly of the ring shoulder, and resiliently deflectable press-on, pry-off cover retaining extensions on the cover section disposed generally axially inwardly of the inner ring margin in press-on, pry-off retained engagement with the wheel, the extensions exerting ring retaining force through the outer cover margin axially inwardly against the inner ring margin and maintaining the axially inner surface of the inner ring margin in clamped engagement against the juncture rim shoulder between the intermediate and radial rim flanges thereby sustaining the wheel cover section and the tire side wall ring on the wheel in assembly together and insuring continued interlocked engagement between the cover and ring shoulders, the outer cover margin being provided with an underturned cover flange and which flange bears said cover rib and shoulder, the cover retaining extensions being disposed at an axially inner end of said flange and disposed for cover retaining engagement with the intermediate rim flange, said underturned cover flange and said inner ring margin each having more than one of said ribs and shoulders interlocked together and with said inner ring margin bottomed against said rim at its juncture between the intermediate and radial rim flanges.

4. In a wheel structure, a wheel including a multi-flanged stepped tire rim and a pneumatic tire with the rim having connected intermediate, radial and terminal rim flanges, the intermediate and radial rim flanges having a juncture rim shoulder at their juncture, wheel balancing weights mounted on the rim underlying the terminal rim flange, a wheel cover section for overlying the wheel having an outer cover margin axially spaced in close proximity to the rim and which cover margin has on its underside a cover rib providing a radially inwardly facing cover shoulder, a non-metallic tire side wall ring having an annular curved ring surface disposed on an axially outer side of the weights, the ring including inner and outer ring margins with the outer ring margin being disposed opposite the tire side wall and with said inner ring margin having a ring rib provided with a radially outwardly facing ring shoulder disposed radially inwardly of the terminal rim flange, the cover and ring shoulders being in lapped engagement with the cover shoulder being disposed radially outwardly of the ring shoulder, and resiliently deflectable press-on, pry-off cover retaining extensions on the cover section disposed generally axially inwardly of the inner ring margin in press-on, pry-off cover retained engagement with the wheel, the extensions exerting ring retaining force through the outer cover margin axially inwardly against the inner ring margin and maintaining the axially inner surface of the inner ring margin in clamped engagement against the juncture rim shoulder between the intermediate and radial rim flanges thereby sustaining the wheel cover section and the tire side wall ring on the wheel in assembly together and insuring continued interlocked engagement between the cover and ring shoulders, the outer cover margin being provided with an underturned cover flange and which flange bears said cover rib and shoulder, the cover retaining extensions being disposed at an axially inner end of said flange and disposed for cover retaining engagement with the intermediate rim flange, said inner ring margin being turned axially outwardly at its radially inner end forming said ring rib and by said outer cover margin being turned axially inwardly and forming said cover rib.

References Cited in the file of this patent

UNITED STATES PATENTS

| | | |
|---|---|---|
| 1,396,515 | McClevey | Nov. 8, 1921 |
| 1,968,076 | Goodyear et al. | July 31, 1934 |
| 2,447,021 | Lyon | Aug. 17, 1948 |
| 2,544,705 | Lyon | Mar. 31, 1951 |
| 2,713,518 | Lyon | July 19, 1955 |
| 2,819,119 | Perrin | Jan. 7, 1958 |
| 2,862,769 | Wood | Dec. 2, 1958 |
| 2,964,357 | Barnes | Dec. 13, 1960 |

FOREIGN PATENTS

| | | |
|---|---|---|
| 436,544 | Great Britain | Oct. 14, 1935 |
| 1,061,278 | France | Nov. 23, 1953 |
| 1,009,510 | Germany | May 29, 1957 |
| 545,897 | Canada | Sept. 10, 1957 |